United States Patent [19]

Higuchi et al.

[11] Patent Number: 4,840,325
[45] Date of Patent: Jun. 20, 1989

[54] SEAT BELT TIGHTENING DEVICE

[75] Inventors: Kazuo Higuchi; Hiroshi Tabata; Hisakazu Okuhara; Hidetoshi Saruwatari; Akihiko Akiyama, all of Wako, Japan

[73] Assignee: Honda Giken Kogyo Kabushiki Kaisha, Tokyo, Japan

[21] Appl. No.: 30,630

[22] Filed: Mar. 27, 1987

[30] Foreign Application Priority Data

Apr. 2, 1986 [JP] Japan .................................. 61-76043
Apr. 2, 1986 [JP] Japan ............................ 61-49160[U]

[51] Int. Cl.⁴ ...................... B60R 22/42; B60R 22/46
[52] U.S. Cl. .................................. 242/107.2; 280/806; 242/107.13
[58] Field of Search ............. 242/107.2, 107, 107.4 R, 242/107.1, 107.13, 107.4 A, 107.4 B, 107.4 C, 107.4 E; 280/806; 297/478, 480

[56] References Cited

U.S. PATENT DOCUMENTS

| 3,976,257 | 8/1976 | Fohl | 242/107 X |
| 4,191,344 | 3/1980 | Tillac | 242/107.4 R X |
| 4,300,731 | 11/1981 | Kondaziola | 242/107.2 |
| 4,389,228 | 6/1983 | Leunig | 242/107 |
| 4,423,846 | 1/1984 | Fohl | 242/107 |
| 4,597,586 | 7/1986 | Burghardt et al. | 280/806 |
| 4,647,071 | 3/1987 | Tabata | 242/107.2 X |

FOREIGN PATENT DOCUMENTS

| 61825 | 10/1982 | European Pat. Off. | 280/806 |
| 3229260 | 2/1984 | Fed. Rep. of Germany | 242/107.4 R |
| 3331696 | 8/1984 | Fed. Rep. of Germany | 242/107.4 R |
| 3329687 | 3/1985 | Fed. Rep. of Germany | 242/107.4 R |
| 53-21574 | 7/1978 | Japan |
| 53-25943 | 7/1978 | Japan |
| 60-259553 | 12/1985 | Japan |

Primary Examiner—John M. Jillions
Attorney, Agent, or Firm—Nixon & Vanderhye

[57] ABSTRACT

A seat belt tightening device for removing slack in a seat belt when the seat belt is required to positively restrain a passenger, comprising clamp members for clamping a part of the seat belt paid out from a retractor device; a winding member for winding thereonto a portion of the seat belt that is located ahead of the part clamped by the clamp means by a rotary motion; and a drive source for causing a rotational motion of the winding member. The winding member may be either integral with one of the clamp members or separate from both of them. Since the slack of the seat belt is removed simultaneously as the seat belt is clamped, the passenger is effectively restrained in case of a vehicle collision without being thrown forward due to any slack in the seat belt, and since the seat belt is allowed to pass through the tightening device without being obstructed under normal conditions the comfort of the passenger is assured by the action of the retractor which is typically provided in conjunction with the seat belt tightening device.

10 Claims, 5 Drawing Sheets

SEAT BELT TIGHTENING DEVICE

TECHNICAL FIELD

The present invention relates to a seat belt tightening device for removing slack in a seat belt by automatically retracting the seat belt so as to minimize the forward motion of a passenger upon the occurrence of a vehicle collision.

PRIOR ART

A seat of an automobile is generally fitted with a seat belt which restrains the motion of the passenger for the purpose of preventing him or her from being thrown forward in case of a vehicle collision, and a seat belt is often equipped with a retractor having an automatic emergency lock device (which is referred to as an ELR device hereinafter) which does not hinder the motion of the passenger under normal conditions but, in the case of a vehicle collision, locks up the winding shaft of the retractor by, for instance, detecting any acceleration of the vehicle in excess of a certain level.

Although an ELR device has the capability to lock up its winding shaft in a very short time upon detection of a certain degree of acceleration or rapid feeding out of the seat belt resulting from a vehicle collision, the passenger may not be sufficiently restrained when the initial slack of the seat belt outside the retractor is excessive or when the seat belt is loosely wound around the winding shaft of the retractor since the passenger may be thrown forward to the extent which the slack of the seat belt outside and inside the retractor permits. The slack in the seat belt outside the retractor is necessary because if the seat belt is taut under normal conditions the passenger will feel very uncomfortable due to the pressure from the seat belt. Also, the slack of the seat belt on the winding shaft of the retractor cannot be totally removed because considerable tension would have to be applied to the seat belt in order to remove the slack in the seat belt as it is wound onto the winding shaft and this would again cause discomfort to the passenger.

Japanese Patent Laying-Open Publication No. 60-259553 (corresponding to West German Patent Application No. P3413488.3) discloses a belt tightener which makes use of a pair of wedges for holding and tensioning a seat belt. The wedges are driven by a piston which is in turn activated by a compressed spring or an explosive. Since the belt is retracted along a straight path by the wedges, a certain space is required to accommodate the motion of the wedges and the system may occupy too much of the space within a passenger compartment.

Japanese Patent Publication No. 53-21574 discloses a seat belt tightener which makes use of an explosive to drive a rotary member and retract an end of a seat belt. However, this tightener is required to be connected to an end of a seat belt and therefore cannot be used in conjunction with an ELR device. Utility Model Publication No. 53-25943 discloses a similar seat belt tightener.

Typically, a power source such as an explosive which can emit its power in a very short time is required for activating a seat belt tightener because the seat belt tightener is required to secure the seat belt before the passenger is thrown forward. If there is an excessive delay in the activation of the seat belt tightener, the passenger will first be thrown forward and then pulled back as the seat belt tightener is activated. This is very undesirable because the passenger will be subjected to forward acceleration and rearward acceleration in rapid succession and this is very harmful to his body.

Also, when the explosive power is transmitted to a mechanism for retracting the seat belt by converting the explosive power into a pulling force acting upon the seat belt, since a large drive force builds up in an extremely short time as the explosion takes place, a large impact in the form of tension of the seat belt may be instantaneously applied to the body of the passenger. This is also undesirable.

Brief Summary of the Present Invention

In view of such problems with the prior art, a primary object of the present invention is to provide a seat belt tightening device which can remove any slack in the seat belt in a very short time without causing excessive tension in the seat belt.

Another object of the present invention is to provide a seat belt tightening device which, when activated, applies a fixed degree of tension to a seat belt irrespective of the condition in which the seat belt is wound around the winding shaft of an ELR device.

Yet another object of the present invention is to provide a seat belt tightening device which is highly compact and yet reliable.

Yet another object of the present invention is to provide a seat belt tightening device capable of controlling the sharp rise in torque produced by an explosive force and transmitted to the pulling mechanism of the seat belt.

According to the present invention such objects are accomplished by providing a seat belt tightening device for removing slack in a seat belt when the seat belt is required to positively restrain a passenger, comprising: a drive source which is activated when the seat belt is required to restrain the passenger; a rotary member which is adapted to be rotated by the drive source; a pair of clamp members accommodating a certain span of the seat belt therebetween without substantially obstructing lengthwise motion of the seat belt, at least one of the clamp members being rotatable relative to the rotary member; and a pair of seat belt guides which are provided at either end of the given span of the seat belt for limiting the motion of the seat belt in a direction perpendicular to a major surface of the seat belt; wherein the rotatable clamp member is provided with a contact surface which pushes a major surface of the seat belt out of line with the direct path between the pair of seat belt guides as the rotary member is rotated by the drive source and a clamp surface which clamps the seat belt in cooperation with a corresponding clamp surface of the other clamp member as the contact surface pushes the seat belt and the moveable clamp member is rotatively driven by a reaction experienced by the moveable clamp member.

Thus, the portion of the seat belt immediately outside the retractor device is clamped and retracted at the same time, and tension can be applied to the seat belt irrespective of the state of the seat belt inside the retractor device. Also, since the seat belt is retracted by the rotary motion of the seat belt tightening device, the space requirements are less than those of the prior art belt tightener.

According to a certain aspect of the present invention, the drive source comprises a pull wire which is pulled upon activation of the drive source while the rotary member comprises a pulley around which the free end of the pull wire is passed and a ratchet means for preventing reverse rotation of the rotary member. Thus, the structure of the seat belt tightening device is simplified and it can be made highly reliable.

According to another aspect of the present invention, the effective radius of the pulley varies from a small value to a large value as the pull wire drives the pulley from an initial stage to a terminal stage.

Thus, the torque which is effective for pulling the seat belt into the seat belt tightening device can be freely determined according to the nature of the driving force of the drive source, and even when an explosive is used as a drive source the pulling force acting on the seat belt can be appropriately controlled.

According to yet another aspect of the present invention, the rotatable clamp member is rotatably supported by the rotary member in an eccentric relationship with respect to the rotary member and the other clamp member is fixedly attached to the rotary member. Thus, the drive force is utilized for both winding the seat belt onto the clamp member and clamping the seat belt between the two clamp members. The other clamp member may be either fixed to the rotary member or rotatably supported by the rotary member.

According to a still further aspect of the present invention, the seat belt tightening device comprises a clamp means for clamping a part of the seat belt that is paid out from a retractor device; a winding means for winding thereonto by a rotary motion a portion of the seat belt that is located ahead of the part clamped by the clamp means; and a drive means for activating the clamp means and causing a rotational motion of the winding means.

Preferably, the winding means comprises a pressure member which presses against a surface of the seat belt by a rotational motion thereof, and the clamp means comprises a moveable member which rotates by being pressed onto the seat belt in cooperation with the winding means and a fixed member which opposes the moveable member interposing the seat belt therebetween in a spaced manner. Thus, since the seat belt is clamped and retracted at the same time by the tightening device, the passenger is effectively restrained in case of a vehicle collision without being thrown forward due to any slack in the seat belt, and since the seat belt is allowed to pass through the tightening device without being obstructed under normal conditions the comfort of the passenger is assured by the action of the retractor which is typically provided in conjunction with the seat belt tightening device.

The pressure member and the moveable member are formed either by a single integral body or separate bodies.

BRIEF DESCRIPTION OF THE DRAWINGS

The present invention will now be shown and described in the following in terms of concrete embodiments thereof with reference to the appended drawings, in which.

DETAILED DESCRIPTION OF THE PREFERRED EMBODIMENTS

Figure 1:
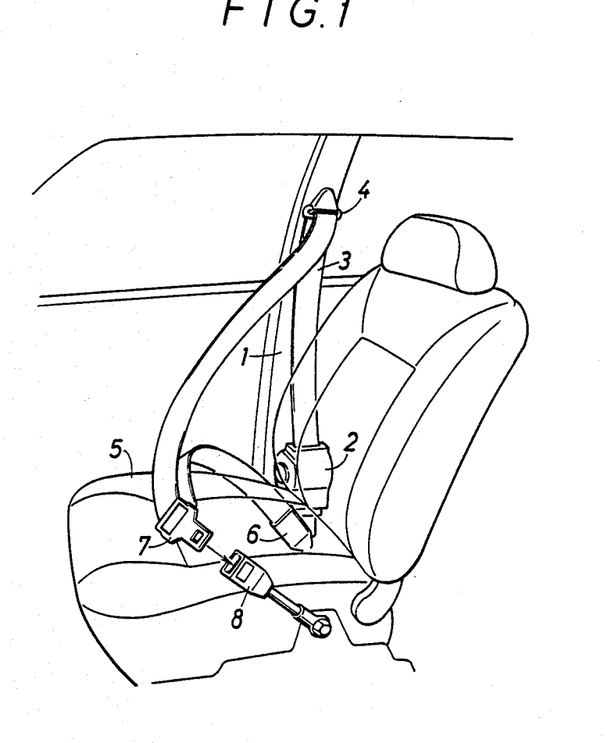
FIG. 1 is an overall structural view of a seat belt system to which the present invention is applied.

FIG. 1 shows the structure of a seat belt device to which the present invention has been applied. The seat belt 3 paid out upwardly from an ELR device 2 fixedly attached to a lower portion of a center pillar 1 of a passenger compartment is passed through a through ring 4 which is mounted on an upper portion of the center pillar 1 and after extending downwardly from the through ring 4 is attached to a rear side portion of the seat 5 at its terminal end 6. A tongue plate 7 is fitted over the portion of the seat belt 3 between the through ring 4 and the terminal end 6 of the seat belt 3.

The seat belt 3 is passed around the shoulder, the chest and the hip of the passenger as he or she pulls out the seat belt 3 from the ELR device 2 once seated on the seat 5 and then latches the tongue plate 7 to a buckle 8 mounted on the opposite side of the seat 5.

Under normal circumstances, since the seat belt 3 can be relatively freely pulled out, without much effort, from the ELR device 2 by way of the through ring 4 against a slight spring force, the upper body of the passenger remains in a relatively freely moveable state. In case of a vehicle collision, the winding shaft for the seat belt 3 provided inside the ELR device 2 is locked up by a ratchet mechanism incorporated in the ELR device 2 and the passenger is restrained from forward motion.

Since simply locking up the winding shaft is not capable of dealing with either the slack in the seat belt 3 produced before detection of a vehicle collision or further tightening of the portion of the seat belt which is already wound around the winding shaft, the passenger restraining action may not be sufficient. In other words, the slack in the seat belt 3 outside the ELR device 2 and the slack in the seat belt 3 of the portion which is wound around the winding shaft of the ELR device 2 permit paying out of the seat belt 3 as the passenger is thrown forward and the seat belt thus becomes effective only after the passenger has been thrown forward to a certain extent. This is undesirable not only because the passenger may hit a solid object such as a windshield before being effectively restrained by the seat belt but also because the passenger is suddenly restrained only after being thrown forward at high speed and is subjected to a very high level of acceleration.

Thus, the seat belt tightening device according to the present invention which is described hereinafter is incorporated in the ELR device 2 at a position adjacent to the exit of the seat belt 3 from the ELR device 2.

Figure 2:
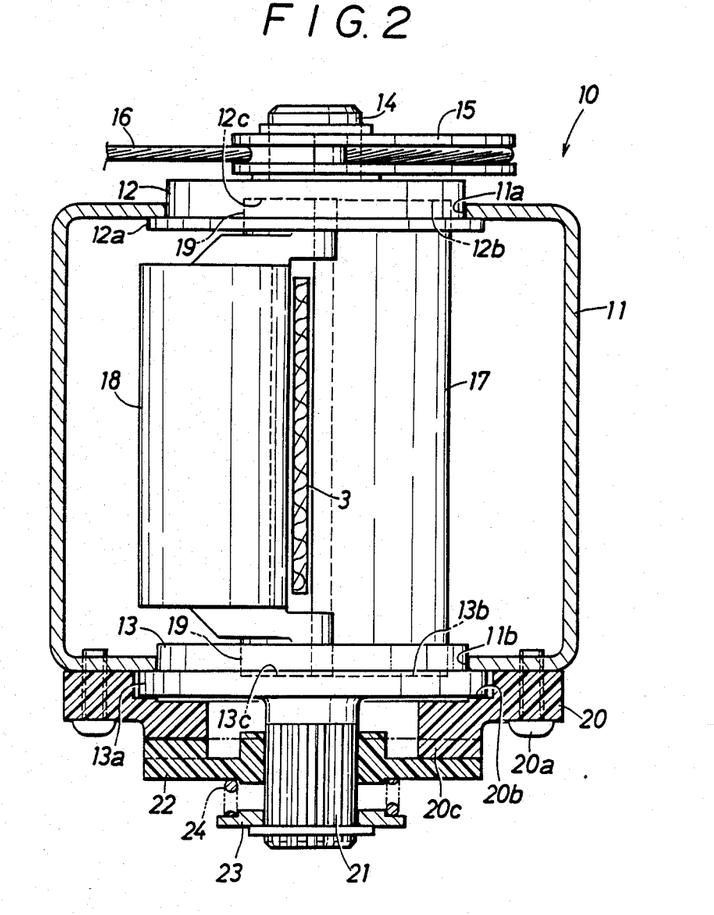
FIG. 2 is a partially broken away plan view of an embodiment of the present invention.

As shown in FIG. 2, the casing 11 of the seat belt tightening device 10 is made by bending a metal plate into a box and a pair of side discs 12 and 13 are fitted into circular holes 11a and 11b which are formed on either side of the casing 11.

The first side disc 12 is fitted into the circular hole 11a from inside with its radial flange portion 12a secured to the inner surface of the casing 11 and an axial boss 14 projects from the center of the other surface of the first side disc 12. The boss 14 is provided with a pulley 15 fixedly attached thereto so as to be integrally rotatable therewith and a pull wire 16 is passed around this pulley 15. One end of this pull wire 16 is connected to a suitable point on the pulley 15 while the other end of the pull wire 16 is connected to a drive source not shown in the drawings.

The second side disc 13 is likewise fitted into the circular hole 11b with its radial flange 13a secured to the external surface of the casing 11.

The inner surfaces of the side discs 12 and 13 which oppose each other are provided with depressions 12b and 13b, respectively, which receive the two axial ends of a fixed clamp member 17, and bearing holes 12c and 13c, respectively, which support the stub shafts 19 formed on the two axial ends of a moveable clamp member 18. Thus, when the two side discs 12 and 13 are fitted into the casing 11, the two clamp members 17 and 18 are held therebetween. The fixed clamp member 17 is fixed to the two side discs 12 and 13 while the moveable clamp member 18 is supported in a freely rotatable manner by the two side discs 12 and 13 at its stub shafts 19. The seat belt 3 which is retracted by the ELR device 2 is passed through the gap between the two clamp members 17 and 18 so as to be freely paid out of and pulled in by the ELR device 2.

A side plate 20 is fitted over the flange 13a of the second side disc 13 by being secured to the external surface of the casing 11 by way of small screws 20a. The inner surface of the side plate 20 is provided with a depression 20b which engages the external surface of the flange 13a so as to restrict axial displacement of the second side disc 13 but permits rotational motion thereof, and the axial end surface of the side plate 20 is provided with ratchet teeth 20c.

The center of the second side disc 13 is provided with an axially externally projecting boss 21 having an axial spline formed on the outer circumferential surface of the boss 21. A stopper plate 22 is fitted over the boss 21 so as to be axially freely slidable relative to the boss 21 and integrally rotatable with the second side disc 13. Further, the stopper plate 22 is biased towards the ratchet teeth 20c by a coil spring 24 which is interposed between a spring retainer 23 fitted over the axial end of the boss 21 and the external surface of the stopper plate 22.

Figure 3:
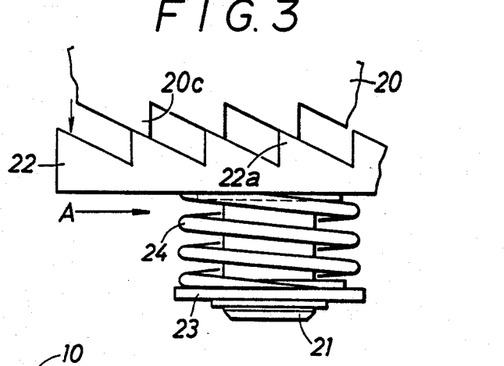
FIG. 3 is a partial view of a mechanism for preventing reverse rotation.

As shown in FIG. 3, the stopper plate 22 is provided with teeth 22a which mesh with the ratchet teeth 20c of the side plate 20. The teeth 20c and 22a are saw-tooth shaped and, because the stopper plate 22 is axially externally moveable over the slopes of the teeth against the spring force of the coil spring 24 as the boss 21 rotates with the stopper plate 22 in the direction indicated by arrow A, do not obstruct the rotation of the boss 21 but, when the boss 21 is turned in the opposite direction and the teeth 20c and 22a mesh with each other, prevent the rotation of the boss 21.

Figure 4:
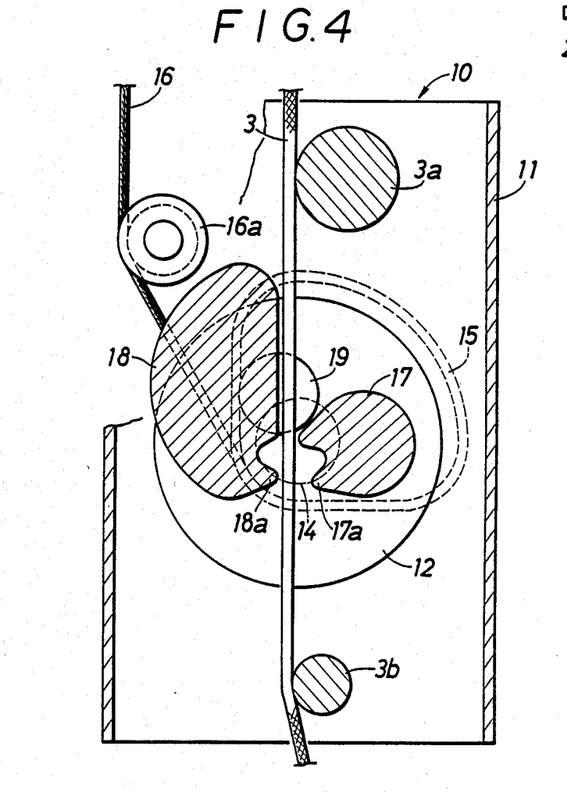
FIG. 4 is a sectional view taken along line IV—IV of FIG. 2.

As shown in FIG. 4, the fixed clamp member 17 and the moveable clamp member 18 are disposed opposite to each other and interpose the seat belt 3 therebetween without touching it.

The fixed clamp member 17 is made of a columnar member having a pair of axial ridges which define fixed clamp teeth 17a and is fixedly held between the two side discs 12 and 13.

The moveable clamp member 18 has a substantially semi-circular cross-section and its outer contour is finished into a smooth curved surface. The stub shafts 19 provided on the two axial ends of the moveable clamp member 18 are rotatably supported by the bearing holes 12c and 13c of the two side discs 12 and 13 as mentioned earlier.

The stub shafts 19 are formed substantially in the centers of the substantially flat surface of the moveable clamp member 18 which opposes the seat belt 3 and their rotational center is offset slightly upwardly, in the sense of FIG. 4, from the rotational center of the two side discs 12 and 13 substantially along the lengthwise direction of the seat belt 3. The portion of the surface of the moveable clamp member 18 opposing the seat belt 3 and located below the stub shafts 19 is provided with a moveable clamp tooth 18a which corresponds to the previously mentioned fixed clamp teeth 17a and is adapted to mesh with the fixed clamp teeth 17a.

The pulley 15 is provided with a triangular contour having a smoothly varying pitch radius along its circumference as indicated by the broken line in FIG. 4 and the wire 16 which is passed around the pulley 15 extends upwardly in the sense of FIG. 4 by way of a guide roller 16a and is connected to the drive source as mentioned earlier. In the drawings, numerals 3a and 3b denote guide rollers which are rotatably supported by the casing 11 for guiding the seat belt 3 along a straight path therebetween.

Figure 6:
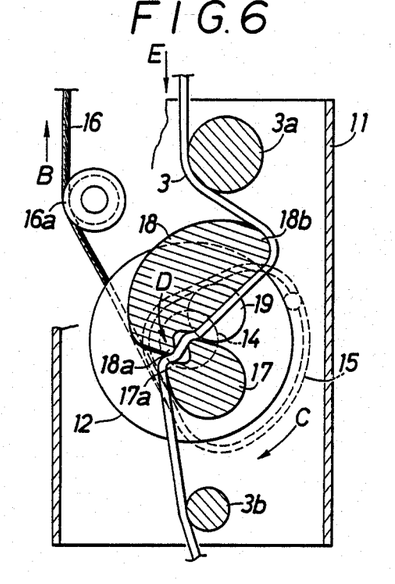
Figure 7:
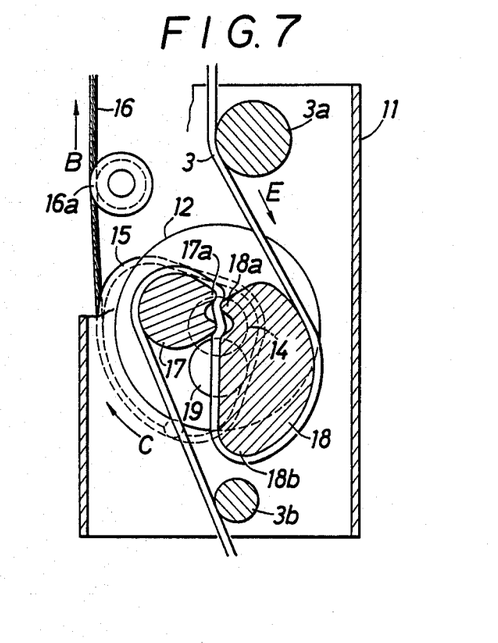

The action of the above described embodiment will now be described with reference to FIGS. 5 to 7.

An end of the wire 16 which is passed around the pulley 16 is connected to a drive source (not shown in the drawings) which utilizes, for instance, an explosive and this drive source cooperates with the ELR device which is of a conventional structure for the purpose of applying tension to the wire 16 immediately after the occurrence of a vehicle collision. The details of the ELR device are not described in this specification because it may be any of a number of conventional ELR devices.

Figure 5:
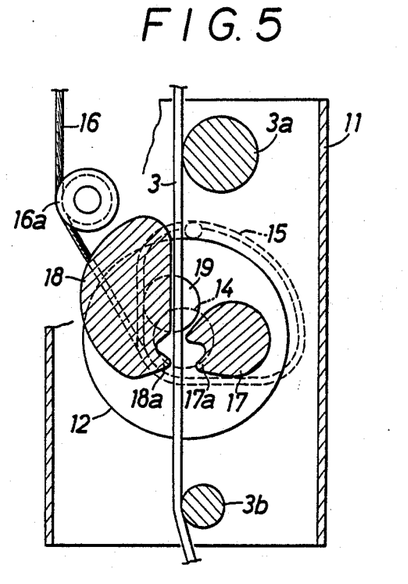
FIGS. 5 to 7 are illustrative views showing the action of the present embodiment.

This system is normally in the state shown in FIG. 5 and the seat belt 3 can be freely taken out and pulled in without the fixed clamp member 17 or the moveable clamp member 18 interfering with the seat belt 3.

When a vehicle collision is detected and the wire 16 is pulled in the direction indicated by arrow B, the pulley 15 rotates in the direction indicated by arrow C and a contact surface 18b of the moveable clamp member 18 comes into contact with the seat belt 3. As a result, the moveable clamp member 18 rotates in the direction indicated by arrow D about the stub shafts 19 while pressing against the seat belt 3 at the contact surface 18b (FIG. 6). At the same time, the moveable clamp tooth 18a comes into contact with the corresponding fixed clamp teeth 17a of the fixed clamp member 17 and the seat belt 3 is held between the two sets of clamp teeth 17a and 18a. As the side discs 12 and 13 rotate further, the seat belt 3 is wrapped around and pulled by the contact surface 18b in the direction indicated by arrow E (FIG. 7). The wire 16 is pulled out further and the contact surface 18b of the moveable clamp member 18 winds the seat belt 3 further therearound as shown in FIG. 7.

When the drive source is activated upon detection of a collision, since the portion of the seat belt 3 immediately outside of the ELR device is thus clamped between the two sets of clamp teeth 17a and 18a with the pulley 15 prevented from rotation in the reverse direction by the ratchet mechanism consisting of the ratchet teeth 20c and the stopper plate 22, and the seat belt 3 wrapped around the moveable clamp member 18 and the fixed clamp member 17, the part of the seat belt 3 that is paid out from the ELR device is not only held securely and prevented from being unwound and pulled out of the ELR device 2, but also the slack of the seat belt both inside and outside the ELR is effectively taken up. Thus, the passenger is prevented from being thrown forward in case of a vehicle collision without experiencing any discomfort under normal conditions.

The pulley 15 has a triangular shape which is such that the radius of the part of the pulley 15 which receives the pulling force at the stage of the initial activation of the drive device is relatively small and the winding torque is accordingly small (FIG. 5). Therefore, even when a drive source having explosive power such as an explosive is used, the problem of rapid excessive winding force does not arise. In a later stage of the explosion, the gas pressure drops but since the portion of the pulley 15 that has a relatively large diameter is then effective (as shown in FIG. 7), a relatively large pulling force is produced with the result that the drive force derived from the explosion is made uniform throughout the entire stroke.

Figure 8:
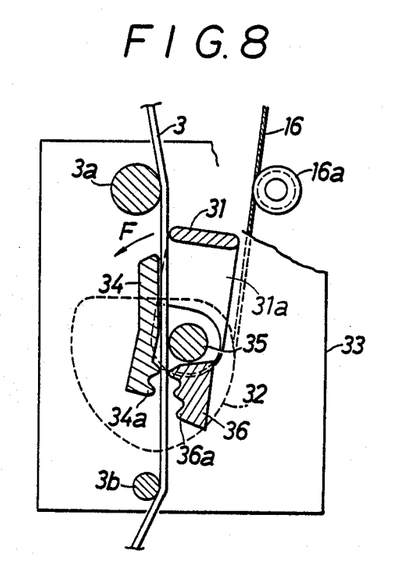
FIGS. 8 to 10 are illustrative views similar to FIGS. 5 to 7 showing another embodiment of the present invention.
Figure 9:
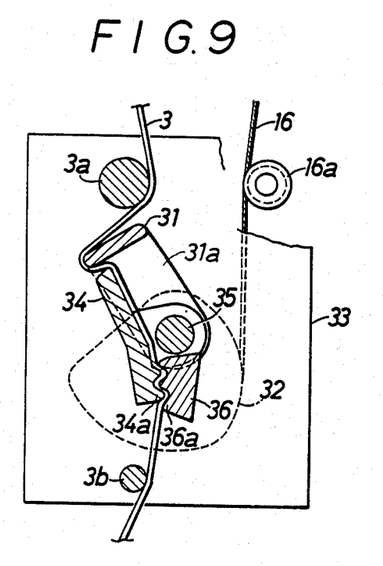
Figure 10:
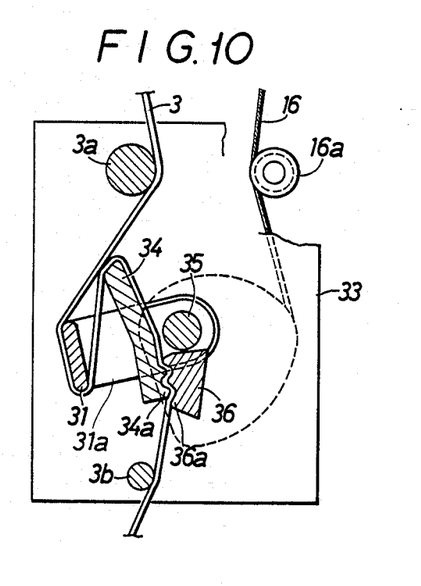

FIGS. 8 to 10 show a second embodiment of the present invention in which the pulley and the mechanism for preventing reverse rotation are similar to those of the previous embodiment.

As shown in FIG. 8, a pressure member 31 is C-shaped and has a pair of legs 31a (only one of them is shown in the drawings) which are rotatably supported by a casing 33 by way of a shaft 35 so as to be integrally rotatable with the pulley 32. The moveable clamp member 34 is rotatably supported, so as to oppose the seat belt 3, by the shaft 35 which is common to the belt pressure member 31, while the fixed clamp member 36 is securely fixed to the casing 33 with its clamp teeth 36a opposing the clamp teeth 34a formed in the moveable clamp member 34 and with the seat belt 3 interposed therebetween.

In the same way as the previous embodiment, when a pulling force is applied to the pulley 32 by the cable 6, the belt pressure member 31 is rotatively driven with the pulley 32 in the direction indicated by arrow F and as shown in FIG. 9 it pulls the seat belt 3 so as to cause the seat belt 3 to be pressed against the moveable clamp member 34. The moveable clamp member 34 rotates under the pressure from the seat belt 3 and the seat belt 3 is clamped between the moveable clamp teeth 34a and the clamp teeth 36a of the fixed clamp member 36.

As the pulley 32 rotates further, the seat belt 3 is wound on the pressure member 31 and the moveable clamp member 34 as shown in FIG. 10 and removes all slack from the seat belt 3.

An explosive is used in both of the above mentioned embodiments as the source for producing the pulling force but other means such as compressed air, spring means and so on which are capable of producing an instantaneous output can be equally well used.

According to the above described embodiments, since the force for clamping the seat belt is produced by the pressure of the seat belt and the clamping force applied to the seat belt increases as the seat belt is wound onto the clamp members, clamping action is highly reliable. Furthermore, since the part of the seat belt that is paid out from an ELR device is clamped and wound irrespective of the action of the ELR device, any slack in the seat belt can be removed without actually retracting the seat belt into the ELR device. Therefore, the action is highly reliable and immediate and the efficiency with which a passenger is restrained in case of an emergency is very high.

Additionally, since the pulling force can be varied depending on the initial torque property of the drive source, no excessive belt load will be suddenly applied to the passenger. In particular, when an explosive is used as a drive source, the initial torque can be reduced while the torque at a later stage of the explosion can be increased, with the result that the belt load can be made effectively constant throughout the entire stroke.

Although the present invention has been illustrated and described with reference to a preferred embodiment thereof, it should not be considered as limited thereby. Various possible modifications and alterations could be conceived of by one skilled in the art with respect to any particular embodiment without departing from the scope of the invention.

What we claim is:

1. A seat belt tightening device for removing slack in a seat belt when the seat belt is required to positively restrain a passenger, comprising:
    a drive source which is activated when the seat belt is required to restrain the passenger;
    a rotary member which is adapted to be rotated about a first axis by said drive source;
    a pair of clamp members accommodating a certain span of the seat belt therebetween without substantially obstructing lengthwise motion of the seat belt, means for fixing one of said clamp members with respect to said rotary member, means for rotatably supporting at least one of the clamp members for rotation with respect to said fixed clamp member about a second axis substantially parallel to an apart from said first axis; and
    a pair of seat belt guides which are provided at either end of the given span of the seat belt for limiting the motion of the seat belt in a direction perpendicular to a major surface of the seat belt, said guides defining a direct path therebetween;
    wherein the rotatable clamp member is provided with a contact surface which pushes a major surface of the seat belt out of line from said direct path between the pair of seat belt guides in response to the rotary member being rotated by the drive source and said rotatable clamp member further includes a clamp surface which clamps the seat belt in cooperation with a corresponding clamp surface of said fixed clamp member as the contact surface pushes the seat belt and said rotatable clamp member is thereby rotatively driven with respect to said fixed clamp member by a reaction which the rotatable clamp member receives from the seat belt.

2. A seat belt tightening device as defined in claim 1, wherein the drive source comprises a pull wire which is pulled upon activation of the drive source while the rotary member comprises a pulley around which the free end of the pull wire is passed and ratchet means for preventing reverse rotation of the rotary member.

3. A seat belt tightening device as defined in claim 2, wherein the effective radius of the pulley varies from a small value to a large value as the pull wire drives said pulley from an initial stage to a terminal stage.

4. A seat belt tightening device for removing slack in a seat belt when the seat belt is required to positively restrain a passenger, comprising:
    a drive source which is activated when the seat belt is required to restrain the passenger;

a rotary member which is adapted to be rotated about a first axis by said drive source;

a pair of clamp members accommodating a certain span of the seat belt therebetween without substantially obstructing lengthwise motion of the seat belt, means for fixing one of said clamp members with respect to said rotary member, means for rotatably supporting at least one of the clamp members for rotation with respect to said fixed clamp member about a second axis substantially parallel to and apart from said first axis; and a pair of seat belt guides which are provided at either end of the given span of the seat belt for limiting the motion of the seat belt in a direction perpendicular to a major surface of the seat belt, said guides defining a direct path therebetween;

wherein the rotatable clamp member is provided with a contact surface which pushes a major surface of the seat belt out of line from said direct path between the pair of seat belt guides in response to the rotary member being rotated by the drive source and said rotatable clamp member further includes a clamp surface which clamps the seat belt in cooperation with a corresponding clamp surface of said fixed clamp member as the contact surface pushes the seat belt and the said rotatable member is thereby rotatively driven with respect to said fixed clamp member by a reaction which the rotatable clamp member receives from the seat belt, wherein the drive source comprises a pull wire which is pulled upon activation of the drive source while the rotary member comprises a pulley around which a free end of the pull wire is passed and ratchet means for preventing reverse rotation of the rotary member, wherein the effective radius of the pulley varies from a small value to a large value as the pull wire drives the pulley from an initial stage to a terminal stage.

5. A seat belt tightening device as defined in claim 4, wherein the rotatable clamp member is rotatably supported by the rotary member in an eccentric relationship with respect to the rotary member and the other clamp member is fixedly attached to the rotary member.

6. A seat belt tightening device for removing slack in a seat belt when the seat belt is required to positively restrain a passenger, comprising:

a drive source which is activated when the seat belt is required to restrain the passenger;

a rotary member which is adapted to be rotated about a first axis by said drive source;

a pair of clamp members accommodating a certain span of the seat belt therebetween without substantially obstructing lengthwise motion of the seat belt, means for rotatably supporting at least one of the clamp members for rotation about a second axis substantially parallel to said first axis; and a pair of seat belt guides which are provided at either end of the given span of the seat belt for limiting the motion of the seat belt in a direction perpendicular to a major surface of the seat belt, said guides defining a direct path therebetween;

wherein the rotatable clamp member is provided with a contact surface which pushes a major surface of the seat belt out of line from said direct path between the pair of seat belt guides as the rotary member is rotated by the drive source and a clamp surface which clamps the seat belt in cooperation with a corresponding clamp surface of the other clamp member as the contact surface pushes the seat belt and the moveable clamp member is thereby rotatively driven by a reaction which the moveable clamp member receives from the seat belt, wherein the rotary member comprises a pressure member which pushes the seat belt in a direction perpendicular to the major surface of the seat belt and the rotatable clamp member is rotatably supported by the rotary member in a coaxial relationship with respect to the rotary member while the other clamp member is fixedly attached to a fixed member.

7. A seat belt tightening device for removing slack in a seat belt when the seat belt is required to positively restrain a passenger, comprising drive means for producing a driving force, said drive means comprising an explosive element, a wire which receives tension from the drive means, and means for winding said seat belt, said winding means including a pulley on which said wire is wound so that slack in the seat belt may be taken up when the drive means is activated, wherein a wire winding radius of said pulley varies along he circumference thereof.

8. A seat belt tightening device as defined in claim 7 wherein the wire winding radius of the pulley gradually varies from a small value to a large value from an initial stage of an explosion of the explosive to a late stage of that explosion.

9. A seat belt tightening device for removing slack from a seat belt when the seat belt is required to positively restrain a passenger, comprising:

a pair of seat belt guides which are provided at either end of a certain span of the seat belt for limiting the motion of the seat belt in a direction perpendicular to a major surface of the seat belt, said guides defining a direct path therebetween;

a drive source which is activated when the seat belt is required to restrain the passenger;

a rotary member which is adapted to be rotated about a first axis by said drive source and provided with a pressure member which, upon rotation of the rotary member, forces a major surface of the seat belt out of said direct path between said seat belt guides; and a pair of clamp members, each having a seat belt clamping surface and accommodating a part of said given span of said seat belt therebetween without substantially obstructing lengthwise motion of the seat belt, means for fixedly attaching one of said pair of clamp members to a stationary member; means for rotatably mounting said other clamp member for rotation about a second axis which is substantially parallel to said first axis;

wherein said rotatable clamp member further includes a contact surface which is pressed upon by said seat belt when said seat belt is forced out of said direct path between said pair of seat belt guides by said pressure member, thereby rotating said rotatable clamp member and forcing said clamp surfaces into clamping contact with said seat belt.

10. A seat belt tightening device as defined in claim 9, wherein said first axis and said second axis are coaxial with respect to one another.

* * * * *